Aug. 20, 1946.　　　N. H. NELSON　　　2,406,302
DIRIGIBLE AIRSHIP
Filed Feb. 22, 1943　　　4 Sheets-Sheet 1

Inventor
Nels H. Nelson
By Caswell + Lagaard
Attorneys

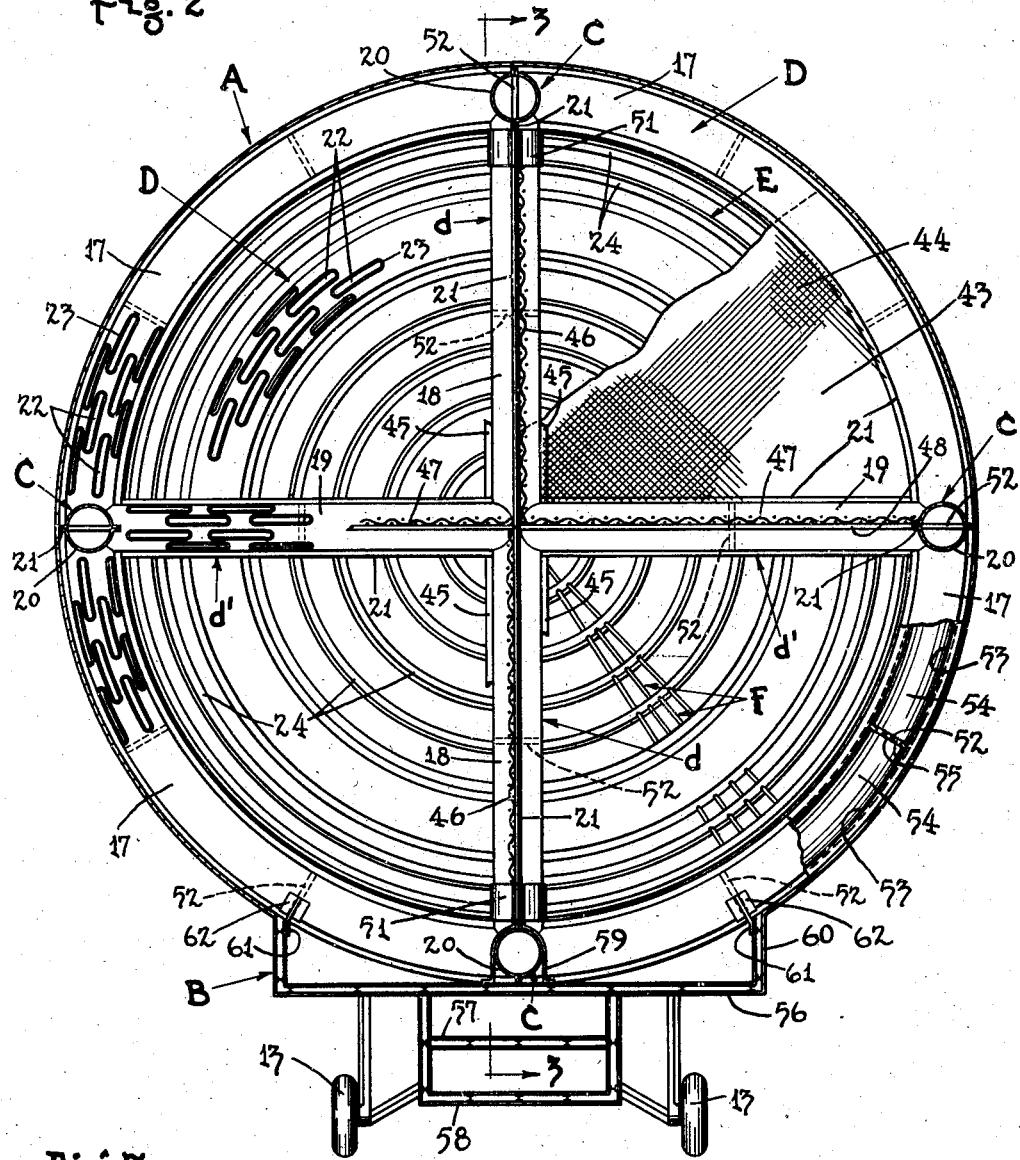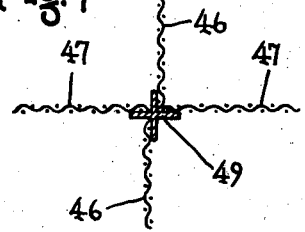

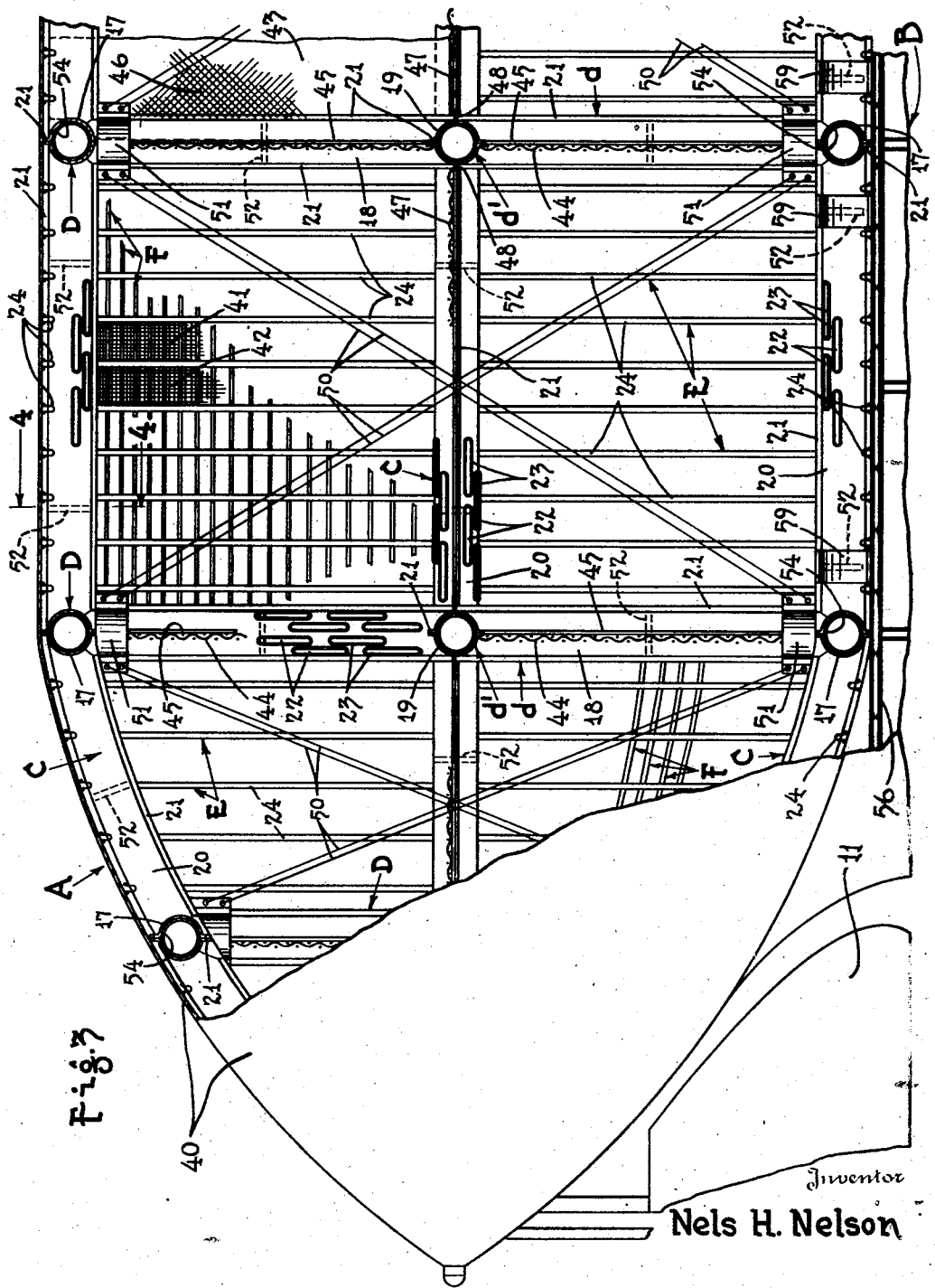

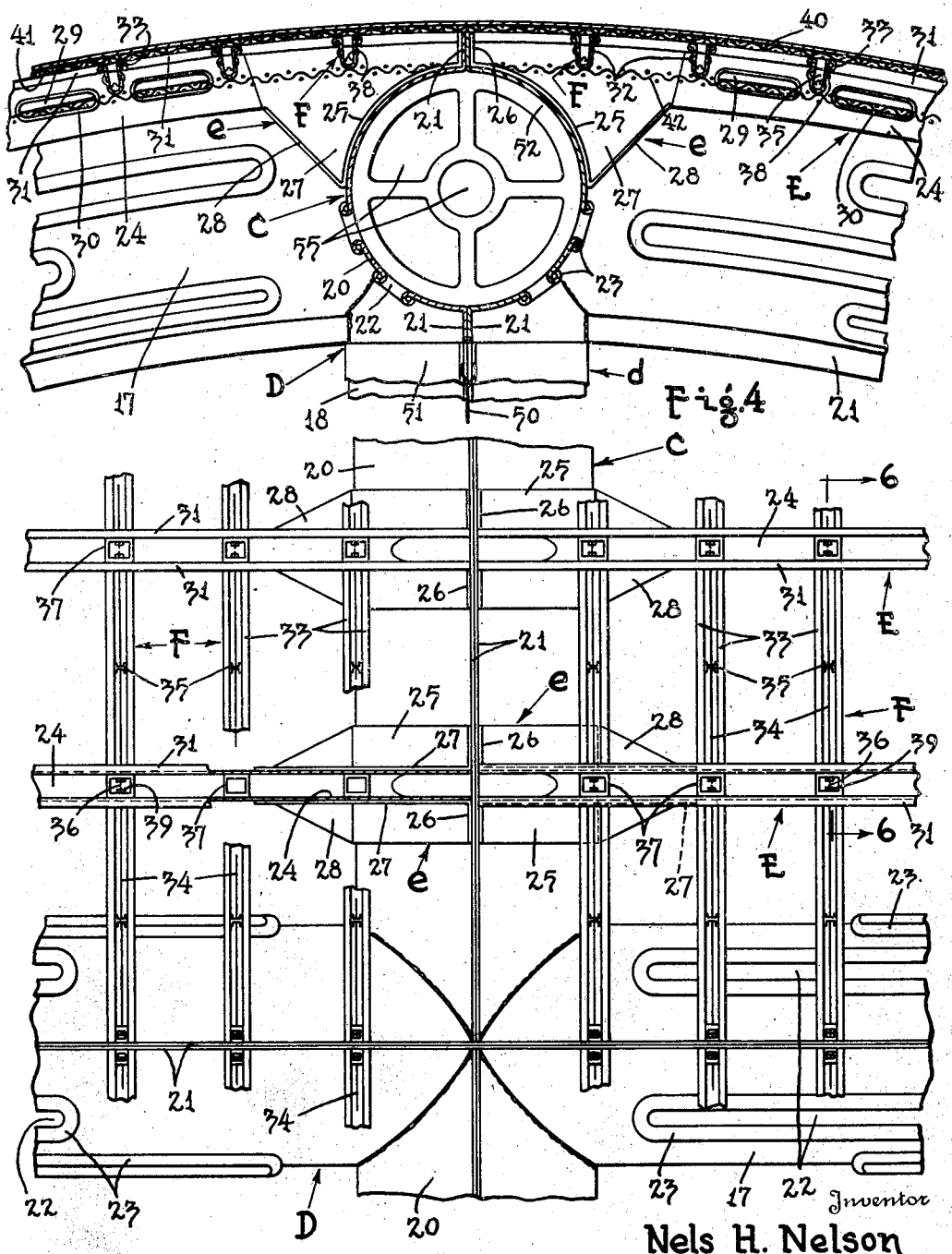

Patented Aug. 20, 1946

2,406,302

UNITED STATES PATENT OFFICE 2,406,302

DIRIGIBLE AIRSHIP

Nels H. Nelson, Minneapolis, Minn.

Application February 22, 1943, Serial No. 476,697

7 Claims. (Cl. 244—30)

My invention relates to improvements in dirigible airships and particularly to balloon structures in such craft, an object of the invention being to provide a rigid balloon structure for relatively large dirigible airships and one which is of great strength and durability, relatively light in weight and relatively inexpensive in construction.

Another object of the invention is to provide in a balloon structure a main frame of tubular elements formed and united for cooperation in rendering the structure durably rigid, a further object of the invention being to provide such tubular frame elements in relatively great cross-sectional dimensions to accommodate therein gas bags of substantial capacity for lending buoyancy to the structure.

An additional object of the invention is to supplement such tubular elements of the main frame of a balloon structure with channel-like reinforcing members effectively arranged and trussed in enhancement of rigidity in the structure.

Other objects of the invention reside in the novel combination and arrangement of parts and in the details of construction hereinafter illustrated and/or described.

Figure 1:
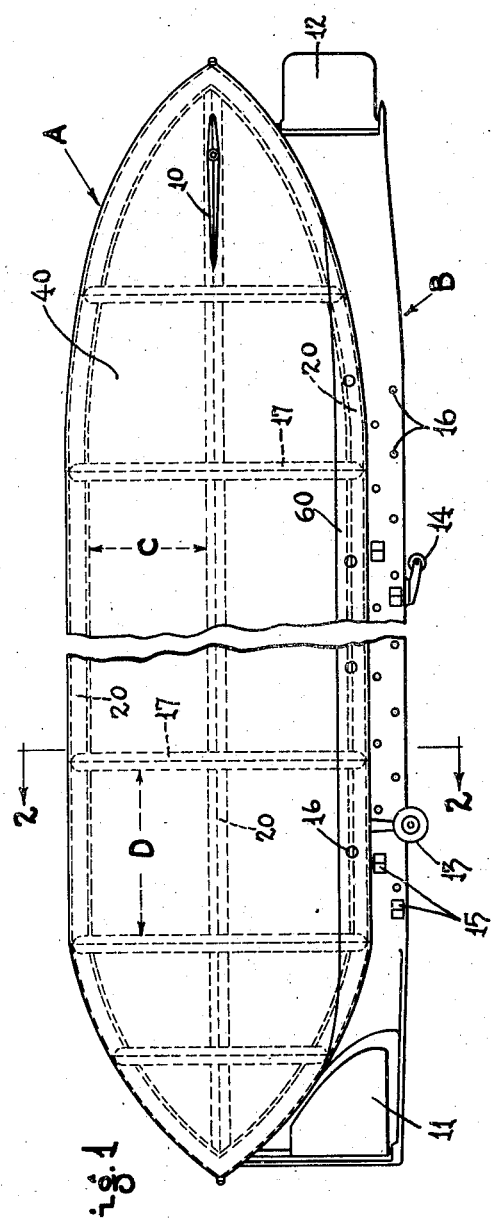
Figure 6:
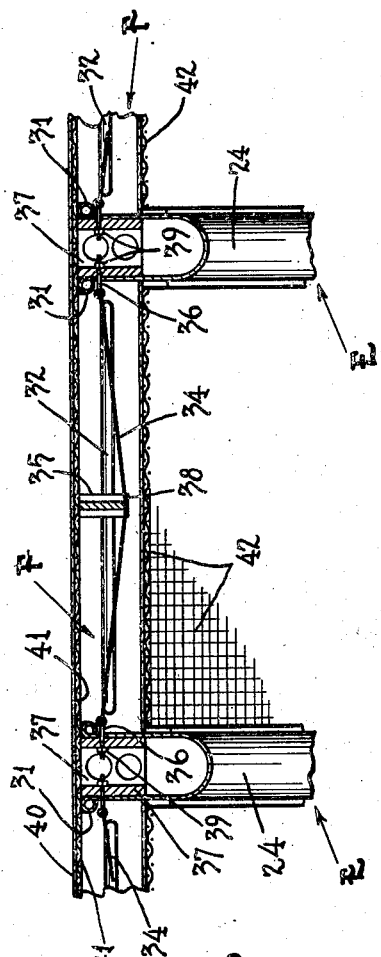

In the drawings, Fig. 1 is a side elevational view of a dirigible airship of the rigid type constituting a form of my present invention; Fig. 2 is an enlarged cross-sectional view taken as on the line 2—2 of Fig. 1; Fig. 3 is an enlarged view partly in elevation and partly in section, particularly illustrating the forward portion of the balloon structure shown in Fig. 1; Fig. 4 is an enlarged detail sectional view taken on the line 4—4 of Fig. 3; Fig. 5 is a plan view in detail of the structure shown in Fig. 4; Fig. 6 is a detail sectional view taken as on the line 6—6 of Fig. 5, and Fig. 7 is a vertical cross-sectional view in detail taken across the axis of the balloon structure and showing a method by which radial partitioning screens may be attached to each other within the bays between the main transverse frames of said structure.

Reference being had to the accompanying drawings in which similar reference characters are employed to designate similar parts throughout the several views, it will be seen that the craft shown as illustrative of the present invention includes an elongated balloon structure A and an underslung body B extending along the lower side of said balloon structure. The balloon structure is fitted with elevating rudders 10 and with fore and aft steering rudders 11, 12. Forwardly of the airship are front wheels 13 and rearwardly thereof are castering wheels 14 for supporting the craft on land. The balloon A is of relatively great capacity for supporting the relatively commodious body B, which comprises a three story structure, as shown, having doors 15 and windows 16 in the walls thereof.

The balloon structure A is of elongated formation, being generally cigar-shaped and, lending form and rigidity thereto, is a framework having a main frame of tubular members of relatively great cross-sectional area, said main frame consisting of a plurality of longitudinal girders C and a plurality of transverse frames D.

The transverse frames D are distributed along the length of the balloon and each thereof comprises an annulus made up of an assembly of quadrantal reaches 17, a diametral pillar $d$ made up of vertically disposed reaches 18 and a diametral rail $d'$ made up of horizontally disposed reaches 19.

In the main frame of the balloon are four longitudinal girders C, each consisting of a number of reaches 20, there being a ridge girder, a keel girder and two side girders. These main longitudinal girders C are straight along the intermediate portion of the balloon, but at the nose and tail thereof, said girders C curvingly converge upon each other, meeting axially of the balloon, where the extreme girder reaches 20 are welded together pointing the main frame fore and aft.

In each main transverse frame D, the reaches 18 of the pillar $d$ and the reaches 19 of the rail $d'$ are welded together at their inner ends axially of the balloon. Adjacent ends of the quadrantal reaches 17 are disposed at the ridge, keel and the opposite sides of the balloon, where they are welded together and to the upper and lower ends of the pillar reaches 18 and the outer ends of the rail reaches 19 and to the adjacent ends of the main girder reaches 20. Thus, the main longitudinal girders C and the main transverse frames D constitute a rigid and sturdy main frame for the balloon structure.

Each of said tubular reaches 17, 18, 19, 20 of said main frame consists of semi-cylindrical body portions of suitable sheet metal, each portion having outwardly extending flanges 21 along either side thereof, the mating flanges of said semi-cylindrical body portions being welded together to complete the tubular reach and strengthen the same. Said tubular reaches of said main frame are preferably lightened in weight by the formation therein of elongated openings 22 extending lengthwise of said reaches in staggered relationship, the sheet material of said tubular reaches at the margins of said openings being beaded outwardly, as at 23, for reinforcing purposes.

Between the main transverse frames D are a number of intermediate transverse frames E, each thereof consisting of an annulus made up of outwardly opening quadrantal channels 24 secured at their ends to the reaches 20 of the main longitudinal girders C at the ridge, keel and opposite sides of the balloon.

The flanges 21 on the reaches 20 of the ridge and keel girders C lie in a vertical plane axially of the balloon A and the flanges 21 on the reaches 20 of the side girders C lie in a horizontal plane also axially of the balloon. The outermost of said flanges 21 are employed in attaching the quadrantal channels 24 of the intermediate transverse frames E to the main longitudinal girders C, the ends of said channels 24, if desired, being welded directly to said main girders proper and to the flanges 21 thereon, as well. Preferably, however, attaching brackets e (Figs. 4 and 5) will be used in attaching said quadrantal channels 24 to said main girders C. These brackets e, supplied in pairs for each end of each channel 24 will each consist of an arcuate body 25 conforming with the transverse curvature of the main girder and will be welded to said girder proper. An attaching flange 26 formed integrally with or welded to said body 25 will be welded to the corresponding flange 21 of the main girder C, while a plate 27 also formed integrally with or welded to said arcuate body 25 will be welded to the corresponding side of the channel 24. This plate 27, preferably, will be braced at its outer extremity relative to the arcuate body 25 by means of a flange 28 integral with or welded to said plate 27 and said body 25. Said quadrantal channels 24 of the intermediate transverse frames E are reduced in weight by the formation of lightening openings 29 in the sides thereof, the strength of said channels being preserved by beading the sides thereof about said openings, as at 30. Further strengthening said channels 24 are beads 31 formed along the outer edges of the sides thereof by rolling said sides upon themselves.

Said quadrantal channels 24 of the intermediate transverse frames E are tied together between the main longitudinal girders C through outwardly opening channel-shaped tie-beams F formed from sheet metal and welded at their ends to said channels 24. These tie-beams F are reinforced at their sides by means of strengthening ribs 32 (Figs. 4 and 6) pressed from the material thereof. Further strengthening said tie-beams F are beads 33 formed from the material thereof along their outer edges, and still further strengthening said tie-beams F, are truss-rods 34. The tie-beams F, in different series thereof, are relatively aligned, each series, in effect, constituting an intermediate longitudinal girder. Each channel-like tie-beam F contains a truss rod 34 which bears intermediately thereof against the inner end of a truss-block 35 located within the channel of the tie-beam and welded to the sides thereof. This truss rod 34 is caught at one end in an eye-bolt 36, anchored in an anchoring block 37 in a channel 24 of one intermediate transverse frame E, the other end of said truss rod 34 being caught in an eye-bolt 36 anchored in a channel 24 of an adjacent intermediate transverse frame E. The truss-blocks 35 are I-shaped in transverse cross-section, the heads thereof being welded to the sides of the beams F. The webs of said truss-blocks 35 traverse the channels of the tie-beams F and are medially notched at their inner ends, as at 38, to receive the truss rods 34. The anchoring blocks 37 in the channels 24 of the intermediate transverse frames E are welded to the sides of said channels and are hollow, not only to render the same light in weight, but also to admit of access to tightening nuts 39 on the eye-bolts 36. In addition to the trusting function primarily performed by the truss-blocks 35 and the anchoring function primarily performed by the anchoring blocks 37, it is to be noted that said blocks effectively reinforce said tie-beams F and the channels 24 of the intermediate transverse frames E, respectively.

Enveloping the framework of the balloon is an outer envelope or skin 40 of suitable material, the same preferably having a foundation 41 (Figs. 4 and 6) in the form of wire mesh stretched over and welded to the edges of the outermost flanges 21 on the reaches 17, 20 of the main transverse frames D and the main longitudinal girders C and also stretched over and welded to the outer beaded edges 31 of the channels 24 of the intermediate transverse frames E and the beaded edges 33 of the tie-beams F between said channels 24. Inner lining strips 42 of wire mesh fill the circumferential spaces between the relatively adjacent quadrantal channels 24 of the intermediate transverse frames E and the similar spaces between the outer flanges 21 on the quadrantal reaches 17 of the main transverse frames D and the channels 24 of the intermediate transverse frames E adjacent thereto. These lining strips 42 are backed against the tie-beams F and welded thereto across the same and said lining strips 42 are also welded along their edges to the sides of said channels 24 of the intermediate transverse frames E, said channels 24 so permitting by reason of the depth thereof which is substantially greater than that of the tie-beams F.

The bays between the main transverse frames D are divided into segmental compartments for correspondingly shaped gas bags 43 employed within the balloon structure A, there being four such bag compartments to each bay. The ends of these compartments consist of partitioning screens 44 applied to the main transverse frames D in each of which one of said partitioning screens 44 spans one of the four segmental openings between one of the quadrantal reaches 17 and the adjacent reaches 18, 19 of pillar d and rail d', respectively. Each segmental partitioning screen 44 is welded along one of its straight edges to a fin 45 which, in turn, is welded to a reach 18 of a pillar d. The other straight edge of such partitioning screen 44 is welded to a corresponding flange 21 of the corresponding reach 19 of a rail d', while the curved edge of such screen 44 is welded to a corresponding flange 21 on the corresponding quadrantal reach 17 in the annulus of a main transverse frame D. Said flanges 21 on said reaches 19, 17 of beam and annulus, respectively, are available for the above noted attachment thereto of the end partitioning screens 44 by reason of their disposition in common planes transversely of the balloon structure. Preferably, the wires of the end partitioning screens 44 will extend in biased relationship relative to the pillars d and beams d' for the purpose of bracing and strengthening the main transverse frames D.

Supplementing the end partitioning screens 44 and the circumferentially disposed wire mesh lining strips 42 to complete the segmental gas bag compartments in each bay between the main transverse frames D, I provide radially disposed partitioning screens, viz., upper and lower screens 46, which lie in the vertical plane of the flanges 21 of the pillars d and the flanges 21 of the ridge and keel girders C, and right and left screens 47 which lie in the horizontal plane of the flanges 21 on the main longitudinal side girders C. The upper edge of each upper radial screen 46 is welded to the depending flange 21 of the ridge girder C and the lower edge of the lower radial screen 46 is welded to the upstanding flange 21 of the keel girder C. The edges of both upper and lower partitioning screens 46, at the ends thereof, are welded to the flanges 21 of adjacent pillars d, such flanges 21 being available for such attachment thereto of said screens 46 by reason of the disposition of said flanges 21 in a vertical plane axially of the balloon structure A. The right and left radial partitioning screens 47 are welded along their outer edges to the inwardly extending flanges 21 of their respective side girders C, and are welded along their edges at the ends thereof to fins 48 which are, in turn, welded to the beam d' of the main transverse frames D. The innermost portions of the vertical screens 46 and the horizontal screens 47 are suitably secured together along the axis of the balloon structure, as through the medium of a cleat 49 (Fig. 7), cross-shaped in cross-section, to the four flanges of which the inner edges of said vertical and horizontal screens 46, 47 are welded. Preferably, after the fashion of the end partitioning screens 44, the wires of the vertical partitioning screens 46 will be biased in their extent relative to the ridge and keel girders C and to the pillars d, while the horizontal partitioning screens 47 will be biased relative to the side girders C and the beams d'. This dispositioning of the wires in the radial partitioning screens 46, 47, as in the end partitioning screens 44, serves appreciably to strengthen the main frame of the balloon.

Further strengthening the main frame are bracing and counter-bracing wires or cables 50, there being two or more of such cables in each bay of the balloon structure, except the two extreme bays, fore and aft. These bracing and counter-bracing cables 50 cross each other in biased relationship substantially in the vertical plane of the partitioning screens 46 and thus lie between the gas bags 43 at either side of the balloon, suitable openings being provided in the inner margins of the horizontal partitioning screens 47 to accommodate said cables 50. These wires or cables 50 for bracing and counter-bracing the main frame of the balloon structure, are attached at their ends to anchoring brackets 51 embracing and welded to the upper and lower portions of the pillars d in the main transverse frames D.

An important feature of the present invention resides in supplying main longitudinal girders and main transverse frames not only of tubular construction, but also of such construction in which the cross sectional dimensions of the tubular reaches are relatively oversized. This construction makes for great strength and rigidity in the balloon structure and it affords space within the tubular reaches of the main frame for auxiliary or secondary gas bags of substantial capacity, whereby virtually no loss of gas bag space is sacrificed in the attainment of the relatively great strength in the framework of the balloon. At intervals along the interior of the tubular reaches 20 of the main longitudinal girders C, and along the reaches 18, 19 of the pillars d and rails d' of the main transverse frames D, and along the quadrantal reaches 17 of said main transverse frames D, are disc-like partitioning webs 52, each welded circumferentially thereof to the semi-cylindrical body portions of its respective reach. These webs 52 serve a double function, one thereof being to reinforce the various reaches of the main frame and the other being to provide partitions within said tubular reaches forming ends to compartments 53 therein for the reception of secondary gas bags 54. Such gas bags 54 disposed within said compartments 53 contribute appreciably to the buoying power of the balloon structure, as will be readily appreciated. To minimize the weight of said partitioning and reinforcing webs 52, I form the same with lightening openings 55 therein.

The body B of the airship will be constructed generally in a manner suiting it to the particular needs thereof, but will include a master or upper floor, as at 56, together with another or other floors suspended therefrom, such for example as the intermediate and lower floors 57, 58 shown in Fig. 2. Said master floor 56 of the ship's body B is, in part, suspended from the keel girder C of the balloon structure A by means of yoke-like hanger straps 59 straddling the reaches 20 of said keel girder C, said hanger straps 59 being welded intermediately thereof to said reaches 20 and the branches of said straps being suitably secured at their extremities to said master floor 56. Through side walls 60, rising from the master floor 56, said master floor is further supported by the main frame of the balloon structure by means of hanger straps 61 at their lower ends to said walls 60 and welded at their upper ends to anchoring plates 62 conforming with the transverse and longitudinal curvature of and welded to the lowermost tubular reaches 17 of the main transverse frames D. Preferably, said anchoring plates 62 will register with correspondingly disposed partitioning webs 52 so that each anchoring plate 62 will be welded to its respective tubular reach 17 directly over the edge of its respective web 52, whereby weight of the ship's body B applied to a tubular reach 17 of a main transverse frame D will be distributed thereover at a reinforced locality thereof. Likewise the hanger straps 59 of the tubular reaches 20 of the keel girder C will register with the reinforcing and partitioning webs 52 within said girder reaches.

From the foregoing, it is apparent that I have provided an airship of relatively simple, durable and inexpensive construction, and that the rigidly sturdy balloon structure employed makes available within its envelope substantially the entire space therein for the reception of gas bags.

Changes in the specific form of my invention, as herein described, may be made within the scope of what is claimed without departing from the spirit of my invention.

Having described my invention, what I claim as new and desire to protect by Letters Patent is:

1. An airship, an elongated balloon structure having a framework including tubular reaches, each consisting of a pair of mating semi-cylindrical members formed from sheet material with outwardly extending flanges along their longitudinal edges, said flanges being welded together to unite the mating members, said reaches being welded together at their ends to provide main longitudinal girders and main transverse frames of annular formation, said framework further including intermediate transverse frames of annular formation made up of channel reaches of sheet material, mounted at their ends on said girders, the disposition of said girders being such that the flanges of each at one side thereof extend outwardly, said channel reaches having attaching brackets welded to the ends thereof and saddled upon and, in turn, welded to said tubular girder reaches proper and to the outwardly extending flanges thereof, the outer edges of said outwardly extending flanges and the outer edges of said channel reaches providing bearing surfaces, and a covering overlying said surfaces.

2. In an airship, an elongated balloon structure, an elongated body underslung therefrom and extending therealong, said structure having a covered framework including main longitudinal girders and main transverse frames made up of tubular reaches of relatively great cross-sectional area welded together, said reaches having spaced transverse partitions therein reinforcing the same and dividing them into compartments, gas bags contained within said compartments, and hangers for said body secured to certain of said reaches at localities thereon contiguous to said partitions.

3. In an airship, an elongated balloon structure having a covered framework including a main frame of longitudinal girders and transverse frames both made up of tubular reaches, the transverse frames being distributed along the length of the balloon structure and defining bays therein, each transverse frame comprising radially disposed reaches welded together axially of the balloon structure and further comprising reaches disposed end-to-end in the form of an annulus and welded together at their adjacent ends and to the outer ends of said radial reaches and to adjacent ends of adjacent reaches of said longitudinal girders, partitioning screens of wire mesh dividing each of said bays into segmental compartments, flanges on said tubular reaches, there being such flanges for each partitioning screen disposed in the plane thereof, the wires of said screens being fastened to the flanges of their respective reaches and biased relative thereto and serving to reinforce said framework, gas bags contained within said compartments and confined therein by said screens, and a body suspended from some of the reaches of said main frame.

4. In an airship, an elongated balloon structure shaving a covered framework including longitudinal girders and transverse frames both made up of tubular reaches, each consisting of a pair of mating semi-cylindrical members formed from sheet material with outwardly extending flanges along their longitudinal edges, said flanges being welded together to unite the mating members, said transverse frames being distributed along the length of the balloon structure and defining bays therein, each transverse frame comprising radially disposed reaches welded together axially of the balloon structure and further comprising curved reaches disposed end-to-end in the form of an annulus and welded together at their adjacent ends and to the outer ends of said radial reaches and to adjacent ends of adjacent reaches of said longitudinal girders, partitioning screens carried by said reaches and dividing said bays into compartments, the flanges on certain of said tubular reaches cooperating with each partitioning screen and disposed in the plane thereof, said screens being fastened to the flanges of their respective reaches and serving to reinforce said framework, gas bags contained within said compartments and confined therein by said screens, and a body suspended from said framework.

5. In an airship, an elongated ballon structure having a framework including outwardly opening channel-like transverse frames of sheet material, outwardly opening channel-like tie-beams of sheet material secured at their ends to the transverse frames, truss rods, one for each tie-beam, each truss rod extending along its respective tie-beam within the same, each tie-beam having a truss block therein intermediate its ends for its respective truss rod, anchoring blocks for the ends of each truss rod, said anchoring blocks being located within contiguous transverse frames, the truss blocks and anchoring blocks being secured to the sides of said tie-beams and transverse frames, respectively, and reinforcing the same.

6. In an airship, a balloon structure having a framework including transverse frames formed from sheet material and being of outwardly opening channel-like formation, outwardly opening channel tie-beams formed from sheet material and secured at their ends to the transverse frames, said transverse frames and tie-beams being beaded along their outer edges and thereby reinforced, a foundation screen overlying said transverse frames and tie-beams, and a covering overlying said foundation screen.

7. In an airship, an elongated balloon structure having a framework formed from sheet material and including reaches secured together to provide longitudinal girders, said framework also including reaches anchored to the girders and providing transverse frames, said framework further including tie-beams between adjacent reaches of said transverse frames, an outer covering enveloping said framework and supported by said girders, transverse frames and tie-beams, gas bags within said framework, and liner-screens mounted on said tie-beams, inwardly thereof and between the reaches of said transverse frames, providing outer confines for said gas bags.

NELS H. NELSON.